Dec. 26, 1950     I. W. FOLK     2,535,279
ELECTRICAL APPARATUS FOR SERVICING AUTOMOBILES
Filed Feb. 4, 1946     2 Sheets-Sheet 1
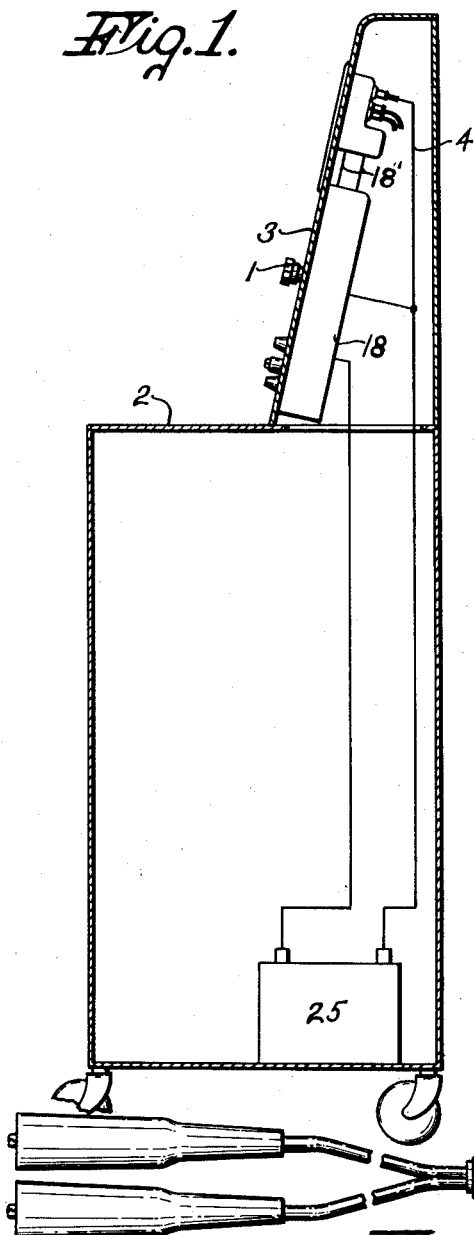
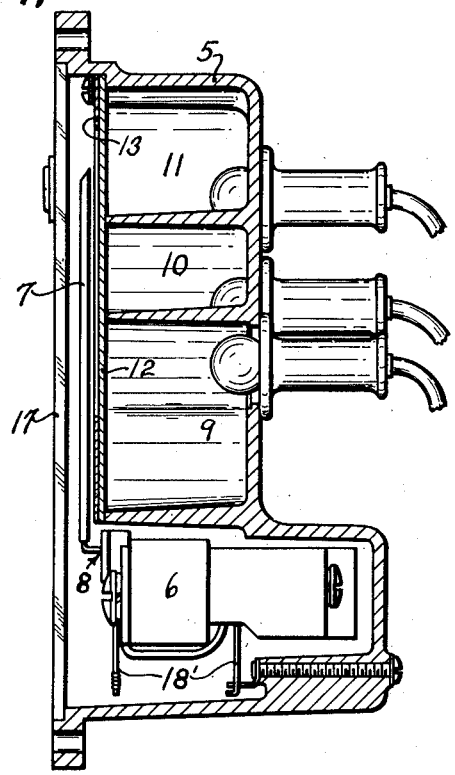
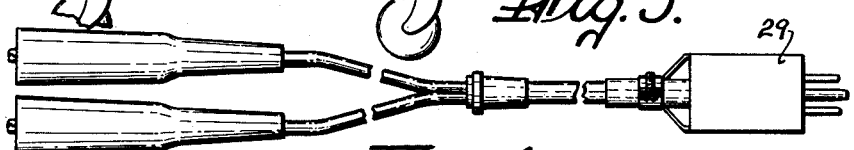
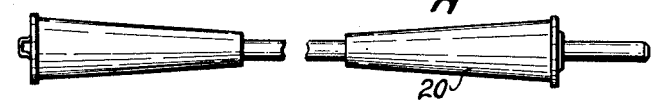
INVENTOR
*IRVIN W. FOLK*
BY *Chapin & Neal*
ATTORNEYS Dec. 26, 1950     I. W. FOLK     2,535,279
ELECTRICAL APPARATUS FOR SERVICING AUTOMOBILES
Filed Feb. 4, 1946     2 Sheets-Sheet 2
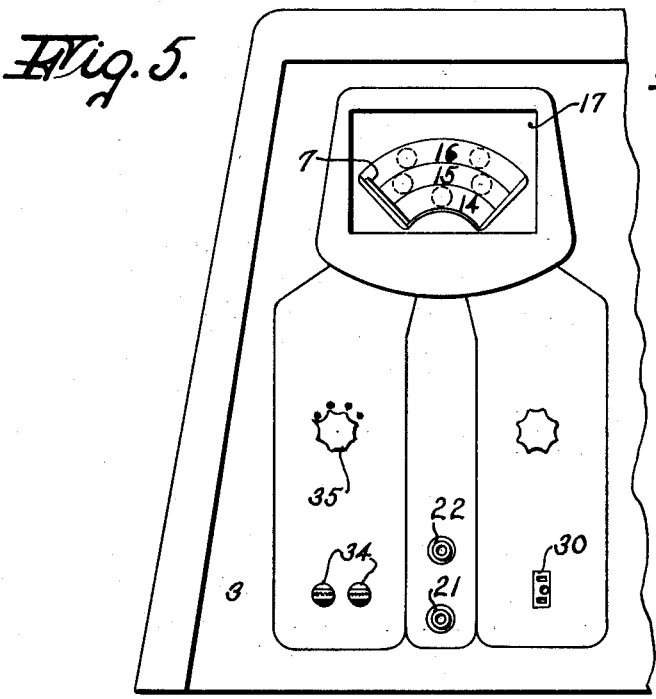
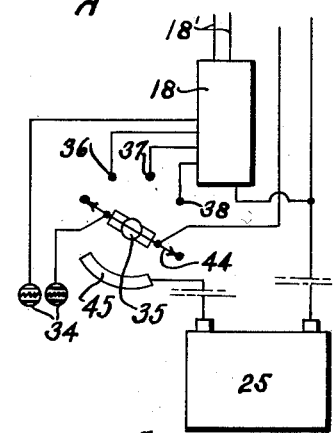
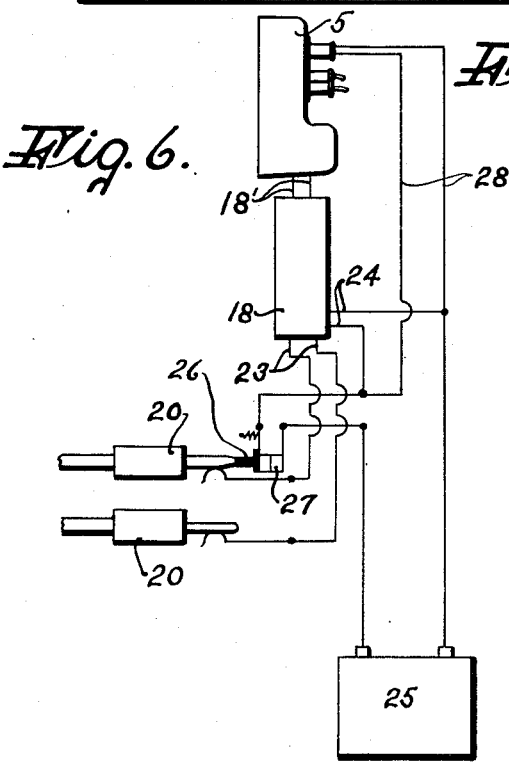
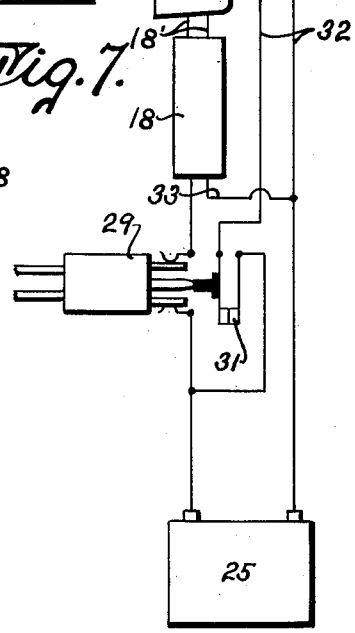
INVENTOR
IRVIN W. FOLK
BY Chapin + Neal
ATTORNEYS Patented Dec. 26, 1950

2,535,279

UNITED STATES PATENT OFFICE 2,535,279

ELECTRICAL APPARATUS FOR SERVICING AUTOMOBILES

Irvin W. Folk, Belleville, N. J., assignor to Atlas Supply Company, Newark, N. J., a corporation of Delaware Application February 4, 1946, Serial No. 645,439

8 Claims. (Cl. 175—183)

This invention relates to electrical apparatus to help mechanics do servicing work, for example in servicing automobiles. It is specially made for workmen at filling stations. They can and do make a great many adjustments, repairs, and replacements of minor parts on automobiles, test and charge batteries and give a variety of service. An important purpose of the invention is to provide improved apparatus to help such service work at filling stations.

The accompanying drawings and their description disclose an example. This example is given from a motor analyzer having a group of test circuits measured by one multi-scale meter and combined with other parts. I will describe the example as a specific thing and the character of the invention will then be pointed out.

Fig. 1 is a diagrammatic cross sectional view of a portable cabinet, for carrying the apparatus, some parts of which, in relation to the cabinet, are indicated only diagrammatically;

Fig. 2 is a cross sectional view of the meter construction and some associated parts;

Figs. 3 and 4 show the nature of high and low tension leads to connect the apparatus with parts to be tested on an automobile;

Fig. 5 is a front view of an instrument panel for the cabinet, with part cut away, indicating the reading face or scale bands of the multi-scale meter construction and connectors on the instrument panel;

Fig. 6 is a diagram to show the relation between the meter, a high tension test circuit, and a lamp circuit corresponding to the test circuit;

Fig. 7 is a similar diagram for a low tension test circuit; and

Fig. 8 is a diagram to indicate a different instrument panel connection for another low tension test circuit.

A cabinet to carry the apparatus of the example is seen generally in Fig. 1. It is mounted on casters, to be wheeled along side of an automobile wherever the latter stops for service, as at filling stations. A storage battery is in the cabinet to avoid the need of a separate power line connection. The main part of the cabinet may hold any convenient tools. A work bench 2 is provided at the desired height and back of that a prominently displayed instrument panel 3 is mounted. Test instruments such as meters, switches, receptacles for making circuit connections and the like are mounted on the panel 3. A compartment 4, in which most of the test circuits are located back of the panel, completes the outer form of the cabinet.

It is desired to show the invention in relation to the way it will be used commercially. The cabinet is to hold more than the combination of the invention. This combination will now be particularly described.

The meter element is shown in Fig. 2. It has a meter casing 5, conveniently molded in one piece with four receptacles or compartments. The meter mechanism 6, in the bottom compartment, is of the permanent magnet, movable coil type. Its hand 7 is pivoted, as at 8, to oscillate over large reading scale bands of usual arc form concentric with pivot 8. One scale to read one test circuit, is positioned in front of receptacle 9, another scale is positioned in front of receptacle 10, and another in front of receptacle 11. These receptacles 9, 10, and 11 are lamp shading receptacles. They contain signalling lamps. The receptacles are to throw the light to signal on the multi-scale bands of the meter.

A sheet 12 made to pass light, covers the otherwise open ends of all receptacles 9, 10, and 11. This sheet is removably fastened to the ledge of meter casing 5 as by screw and retaining strip means 13. The sheet provides a removable front wall for all the lamp shading receptacles. Such sheet or wall 12, seen back of the window 17 in Fig. 5, is preferably of translucent plastic material on which the scale bands are calibrated within the portion covering the receptacles. The area of each scale band is indicated in Fig. 5; band 14 is the front wall for receptacle 9, band 15 for receptacle 10, and band 16 for receptacle 11. The front edges of these receptacles, of Fig. 2, are positioned against the rear side of wall 12, and such boundary edges of the receptacles are the boundary lines for the areas of scale bands 14, 15, and 16, of Fig. 5. Each one of the receptacles throws the light of its contained lamp or lamps through wall 12 but only through that part which is the scale band area corresponding to the one receptacle. The light from the one receptacle is diffused through its portion of sheet 12 over the whole of its particular scale band area and is confined to such scale band area.

The glass window 17, Fig. 2, is mounted on the outer ledge of meter casing 5 to protect the meter hand and the wall 12 with its scale bands, as indicated also in Fig. 5. The window 17 is framed as indicated and the meter casing at the front is about the area of window 17. The end sides of box-like compartments 9, 10, and 11 are closed. The meter casing assembly is mounted on the instrument panel 3 as seen in Fig. 1. The test circuits are connected to meter wires as 18' in the bottom of the casing, Fig. 2.

The test circuits for the meters are carried conveniently for the most part, on the back of the instrument panel as in a chassis box or otherwise. This is indicated by the outline of chassis box 18 for the circuits in Fig. 1. The lamp circuits are carried up into compartment 4 of the cabinet and connected at the back of the meter casing to the lamps in their shading receptacles. This will be clear from the diagrams of Figs. 6 and 7. It is implied in the diagram of Fig. 8 to be described.

These diagrams indicate a high tension test circuit in Fig. 6, a low tension test circuit in Fig. 7, and another low tension circuit in Fig. 8, with their corresponding lamp circuits for signalling the establishment of their operating relation to the meter. Such relation is controlled by the hand actuated leads of Figs. 3 and 4, and mating connector means on the instrument panel 3 as will be described with relation to Figs. 6 and 7. There is a hand control switch for the diagram of Fig. 8 arrangement instead of a portable lead.

The reason for indicating only a portion of instrument panel 3 in Fig. 5, is to indicate only the one multi-scale meter, with which several test circuits, lamp circuits, and operating devices are related to carry on one example of the invention and its mode of operation. A second meter with associated parts to carry out another example of the invention can be mounted on the same instrument panel. But to describe a second one is not pertinent to the claims made in this application. The instrument panel is planned to carry other details not shown or directly related to this invention.

The invention is not confined to the particular kinds of electrical circuits. Test circuits per se are of many kinds and various groupings may be made. Likewise other service circuits as when charging batteries may be grouped. The idea is to take a convenient group of test circuits or service circuits as each may be available in old or improved form and associate them with other parts for this invention. In the example, consider that the multi-scale meter shown is to serve three test circuits, known as condenser test, an engine speed test, and a distributor test. These are respectively low, high, and low tension test circuits. Such circuits are available per se in forms known in this art. For example, the engine speed test circuit is found in a tachometer instrument. This is not so much a test as a service circuit to indicate speed to help other tests. The test or service circuits do not need to be described in detail. Many types are well known.

Referring now to Fig. 5, the instrument panel has an apron outline below the meter and divided to indicate separate means relating to the three "tests" to be read on the one multi-meter instrument. Assume that two leads 20, of the type shown in Fig. 4, are plugged into sockets 21 and 22 of Fig. 5. Then the relation of the parts to be discussed with the diagram of Fig. 6 is established. The "test" circuit, not to be described in detail, is assumed for the most part to be in box 18. It has connections 18' at the top to carry current inside meter casing 5 to operate the latter. It has connections 23, normally open, but now connected through leads 26, over to the automobile part which is put between the spring clip ends of leads 20 and thus connected in the test circuit. The current for this "test" circuit, assuming it is a tachometer circuit is supplied from the high tension ignition circuit of the automobile but electronic parts of a usual tachometer circuit are operated by direct current. This is indicated by wires 24 connecting battery 25 into the circuit for the purpose. When plugs 20 are hand actuated to establish the test circuit of box 18 in operating relation to the meter, the top plug 20 moves an insulating piece 26 to close switch 27 which is normally open under spring bias. Switch 27 is in a lamp circuit from battery 25 to the lamp or lamps in the receptacle of meter casing 5, Fig. 2, which corresponds to that scale band which is calibrated for reading results from the particular "test" circuit. In this case let this be receptacle 11 of Fig. 2, corresponding to the engine speed "test" circuit, read on scale band 16 of Fig. 5.

The similar plan for a low test circuit is shown in the diagram of Fig. 7. In this case, when the low tension plug 29 is put in socket 30, its central prong, of insulating material closes normally open switch 31 to establish the lamp circuit 32 from battery 25 to any lamp in lamp shading receptacle 10 of Fig. 2, assuming it to be the receptacle corresponding to the scale band 15 of Fig. 5, for reading results of the test circuit, which in the example may be the distributor test. This test circuit is established as indicated, whenever plug 29 is inserted in the connecting receptacle 30 of Fig. 5. The plug and receptacle have interfitting parts requiring proper polarized connections. In this plan the battery 25 supplies the current for the test circuit and the lamp circuit as the wiring diagram shows. In a similar manner a third test circuit, here assumed to be a condenser test circuit, readable on scale band 14 of Fig. 5, is associated with a lamp circuit for the meter receptacle 9 of Fig. 2. This circuit has the condenser terminals clipped in as at 34, the circuit is established by turning hand knob 35 from its "off" position and the test circuit is closed or opened simultaneously with its lamp circuit. This third test circuit and associated lamp circuit is diagramed in Fig. 8. As indicated, when switch knob 35 is turned from "off" position to make contact with any of the contacts 36, 37, and 38, which may be terminals for the capacity, leakage, and resistance sections of a condenser test circuit, such knob also turns insulated arm 44 to make contact with strip terminal 45. By analogy with the other diagrams described, it will be seen that the lamp circuit for the condenser test circuit is completed whenever the test circuit is established by the hand knob.

Referring now to Figs. 3, 4, and 5, the apparatus is used according to the example given as follows. A workman attaches the terminals of a condenser by clips 34, Fig. 5, then turns switch knob 35 to contact 36 for a capacity, to contact 37 for a leakage test, to contact 38 for a series resistance test in this test circuit. He reads the results from scale band 14. Then he turns knob 35 back to "off" position. He clips two leads such as shown in Fig. 4, to the high and low side of an engine spark plug, inserts the other ends of the leads into the panel receptacles 21 and 22, Fig. 5, and with the engine going, he reads its speed from scale band 16. Then he disconnects these leads and connects the leads at their clip ends indicated in Fig. 3, to parts of the distributor on the automobile, the other ends are plugged into panel receptacle 30, and he reads the test results from scale band 15.

In this test work, the hand actuated means to establish the test circuits at the instrument panel are respectively, the knob switch 35, the high tension leads and receptacles 21 and 22, and the low tension leads 29 and receptacle 30. They are respectively different things and one can not be used to establish any but its own proper predetermined test circuit. The workman should not confuse them. When he establishes a test circuit, he simultaneously establishes its corresponding lamp circuit as has been described with diagrams in Figs. 6, 7, and 8. The lamp or lamps of each test circuit give the signalling light which is thrown by its lamp shading receptacle only on a portion of the multi-scale wall 12 corresponding to the boundary of the scale band used for the reading of the one test circuit. The light does not spread over to any other scale band because of the meter casing construction shown in Fig. 2. It should be remembered from the description of Fig. 2 construction, that the single wall 12 carries all the scale bands of the multi-scale meter, that the light throwing receptacles 9, 10 and 11, by their construction mark off the boundaries which determine the areas of the several scale bands on the one wall 12. When the one test circuit corresponding to one scale band is established, the one lamp circuit corresponding to that one test circuit is simultaneously closed, and it is the signalling light which then most prominently marks off a scale band area, a portion only of the whole area of wall 12 for reading that test circuit. This results in providing a simple, inexpensive, efficient arrangement of one multi-scale meter fo rseveral test circuits, with a lamp signalling means having lamp shading receptacles dividing the reading wall of the meter into portions that are separately shown as the right portion to read according to the test circuit established in operating relation to the meter.

From what has been said it will be clear that the invention is useful as a combination in apparatus having a group of electrical circuits for servicing automobiles. Its purpose is to make the structure at low cost, to simplify it from the view point of the user, and to guard against misuse. In the past the apparatus in this class is complicated, hard to use, and liable to misuse. The new apparatus is relatively much easier to use; its construction and mode of operation results in getting the ordinary workman quickly acquainted with the way it helps in his work.

It is feasible to assemble in one portable cabinet, many electrical circuits and scientific measuring instruments needed to test or service automobiles, automobile parts, engines or analogous things. This general plan is followed in various ways. The assembly in one cabinet of many instruments has caused confusion in their use. One plan of the invention above disclosed is to provide a way to avoid this confusion. This way helps to guide the work. Considering the invention as disclosed in one combination, it will be clear that different embodiments of this combination may be built into the same cabinet using the same instrument panel. The cabinet carrying the panel with the group of circuits described may also carry a coil test circuit, a voltage test circuit, and an exhaust gas analyzer circuit. These three may be combined in a similar manner to that group above described, to be measured on the same meter construction as that described in the same way except for the calibrations. Then the workman has available many electrical circuits but each group and its associated devices according to the invention will result in getting this work done by a workman unskilled in the use of scientific measuring instruments.

Having disclosed my invention, I claim:

1. The combination of an instrument panel for an electrical testing apparatus of the kind described, a hand operable switching means made as a plug-in switch and carried on said panel for cable connection, an electrical testing circuit connected to said plug-in switch, a meter having a meter movement for the measurement of the characteristics of an electric current, said meter adapted to be put into and taken out of the electrical testing circuit by the plug-in switch, the movement of said meter to be energized through said testing circuit, a meter casing mounted on and positioned behind said panel, one wall of said casing being made of light passing material, said light passing portion of the casing wall forming the meter face and visible on the front of the instrument panel through a window provided in the panel, a testing scale band carried on the lower portion of said meter face, a reading hand connected to the meter movement and caused to move when said movement is energized through the testing circuit, a lamp and lamp shading receptacle mounted in the meter casing immediately behind the portion of the meter face bearing said testing scale band to illuminate only that portion, a lighting circuit for said lamp, a manually operable switch for said lighting circuit, said switch being interlocked with the said plug-in switch carried on the instrument panel for simultaneous opening and closing of both switches to cause illumination of the meter scale band only when the meter is in said electrical testing circuit, and together with the foregoing structure, another testing scale band and lamp and lamp shading receptacle for such band and these mounted above the first mentioned ones in the same way on the meter face to form with them box-like compartments, each with its scale for the meter casing, a separate lamp circuit and manually operable switch for the lamp of the second receptacle, another plug-in switch carried on the instrument panel and another electrical testing circuit connected to such plug-in switch, said second testing circuit leading to the one meter to put the meter in said second testing circuit by its plug-in switch, the plug-in switch of the second named electrical testing circuit being interlocked with the manually operable switch for the added lamp, all constructed as stated to provide individually illuminated scale bands each lighted only when the corresponding selected testing circuit is connected to the one meter through the plug-in connection on the instrument panel and the meter is thus made ready to show the results of individual tests.

2. Testing apparatus comprising in combination, a meter having a meter movement, a light-passing reading face for the meter, a plurality of arcuate scale bands carried by the reading face, a pointer hand moved by the meter movement adapted to swing over all of said scale bands, a light-impervious receptacle arranged in back of the reading face shaped to conform to one of said scale bands, a lamp in said receptacle, a source of electrical energy, a lamp circuit leading from said source to said lamp, a normally open switch in said lamp circuit, a test circuit connected to the meter movement and to one side of said source, a second conductor extending from the test circuit to the other side of said source through said switch, manually operable means for closing said switch in the lamp circuit and simultaneously applying potential to the test circuit, a light-impervious receptacle arranged in back of the meter face shaped to conform to the second scale band, a lamp in the second receptacle, a lamp circuit leading from said source to the second lamp, a normally open switch in the second lamp circuit, a second test circuit connected to one side of said source, and manually operable switch means for connecting the other side of the source to the second test circuit and closing the switch in the second lamp circuit.

3. Testing apparatus comprising in combination, a meter having a meter movement, a light-passing reading face for the meter, a plurality of arcuate scale bands carried by the reading face, a pointer hand moved by the meter movement adapted to swing over all of said scale bands, a light-impervious receptacle arranged in back of the reading face shaped to conform to one of said scale bands, a lamp in said receptacle, a source of electrical energy, a lamp circuit leading from said source to said lamp, a normally open switch in said lamp circuit, a test circuit connected to the meter movement and to one side of said source, a second conductor extending from the test circuit to the other side of said source through said normally open switch, manually operable means for closing said switch in the lamp circuit and simultaneously applying potential to the test circuit, a light-impervious receptacle arranged in back of the meter face shaped to conform with the second scale band, a lamp in the second receptacle, an open lamp circuit leading from said source to the second lamp, a test circuit connected to the meter movement and to one side of said source, manually operable switch means extending the second test circuit and connecting the other side of the source to the second test circuit, and means moved by said manually operable means for closing the second lamp circuit.

4. Testing apparatus comprising in combination, a meter having a meter movement, a light-passing reading face for the meter, a plurality of arcuate scale bands carried by the reading face, a pointer hand moved by the meter movement adapted to swing over all of said scale bands, a light-impervious receptacle arranged in back of the reading face shaped to conform to one of said scale bands, a lamp in said receptacle, a source of electrical energy, a lamp circuit leading from said source to said lamp, a normally open switch in said lamp circuit, a test circuit connected to the meter movement and to one side of said source, a second conductor extending from the test circuit to the other side of said source through said normally open switch, means for closing said switch in the lamp circuit and simultaneously applying potential to the test circuit, a light-impervious receptacle arranged in back of the meter face shaped to conform with a second scale band, a lamp in the second receptacle, a second lamp circuit leading from said source to the second lamp, a normally open switch in the second lamp circuit, a test circuit connected to one side of said source, switch means for connecting the other side of the source to the second test circuit and closing the switch in the second lamp circuit, a light-impervious receptacle arranged in back of the meter face shaped to conform to a third scale band, a lamp in the third receptacle, a third lamp circuit leading from the source to the third lamp, a normally open switch in the third lamp circuit, a third test circuit connected to the meter movement and to one side of the source, a pair of terminals, a conductor leading from the other side of the source to one of said terminals, a conductor leading from the third test circuit to the other of said terminals, and means for extending the third test circuit beyond the terminals and closing the switch in the third lamp circuit.

5. Testing apparatus comprising in combination, a meter having a meter movement, a light-passing reading face for the meter, a plurality of arcuate scale bands carried by the reading face, a pointer hand moved by the meter movement adapted to swing over all of said scale bands, a light-impervious receptacle arranged in back of the reading face shaped to conform to one of said scale bands, a lamp in said receptacle, a source of electrical energy, a lamp circuit leading from said source to said lamp, a normally open switch in said lamp circuit, a test circuit connected to the meter movement, manually operable means for closing said switch in the lamp circuit and simultaneously applying potential to the test circuit, a light-impervious receptacle arranged in back of the meter face shaped to conform with the second scale band, a lamp in the second receptacle, a lamp circuit leading from said source to the second lamp, a normally open switch in the second lamp circuit, a test circuit connected to said meter movement, switch means extending the second test circuit and applying potential from said source to the second test circuit, and means carried by the last switch means for closing the switch in the second lamp circuit.

6. In testing apparatus, a panel, a meter mounted on the panel and having a meter movement, a light-passing reading face for the meter, a scale band carried by the reading face, a pointer hand moved by the meter movement adapted to swing over said scale band, a light-impervious receptacle arranged in back of the reading face shaped to conform to said scale band, a lamp in said receptacle, a source of electrical energy, a lamp circuit leading from said source to said lamp, a normally open switch in said lamp circuit, a pair of terminals on the panel, a test circuit connected to the meter movement and to one side of said source, conductors extending from the test circuit to the terminals, a conductor extending from the test circuit to the other side of said source through said normally open switch, and manually operable means engagable with said terminals for extending the test circuit, and means carried by the last mentioned means for closing said switch in the lamp circuit to energize the lamp and apply potential to the test circuit.

7. In testing apparatus, a panel, a meter mounted on the panel and having a meter movement, a light-passing reading face for the meter, a scale band carried by the reading face, a pointer hand moved by the meter movement adapted to swing over scale band, a light-impervious receptacle arranged in back of the reading face shaped to conform to said scale bands, a lamp in said receptacle, a source of electrical energy, a lamp circuit leading from said source to said lamp, a normally open switch in said lamp circuit, a pair of terminals on the panel, a test circuit connected to the meter movement and to one side of said source including a conductor extending to one terminal, a conductor extending from the other side of the source to another of said terminals, manually operable means for closing said switch in the lamp circuit, and means carried by the last means engaging said terminals extending the test circuit outwardly from the panel and applying potential to the test circuit.

8. In testing apparatus, a meter having a meter movement, a light-passing reading face for the meter, a scale band carried by the reading face, a pointer hand moved by the meter movement adapted to swing over said scale band, a light-impervious receptacle arranged in back of the reading face shaped to conform to said scale band, a lamp in said receptacle, a source of electrical energy, a lamp circuit leading from said source to said lamp, a test circuit connected to the meter movement and to one side of said source, a conductor extending from the test circuit, means including a switch for connecting the test circuit to the other side of said source and moving the first switch to a closed position, and a test circuit conductor extending from a movable part of said switch.

IRVIN W. FOLK.

REFERENCES CITED

The following references are of record in the file of this patent:

UNITED STATES PATENTS

| Number | Name | Date |
| --- | --- | --- |
| 1,942,012 | Webber | Jan. 12, 1934 |
| 2,038,241 | Scofield | Apr. 21, 1936 |
| 2,044,546 | Ryan et al. | June 16, 1936 |
| 2,096,131 | Oestermeyer | Oct. 19, 1937 |
| 2,125,840 | Brooks et al. | Aug. 2, 1938 |
| 2,132,094 | Brodton | Oct. 4, 1938 |
| 2,303,010 | Walter | Nov. 24, 1942 |
| 2,466,558 | Sadlon | Apr. 5, 1949 |

FOREIGN PATENTS

| Number | Country | Date |
| --- | --- | --- |
| 345,660 | Great Britain | Mar. 23, 1931 |
| 364,050 | Italy | Oct. 20, 1938 |
| 476,303 | Great Britain | Dec. 3, 1937 |